Oct. 18, 1966  L. D. FELIX ETAL  3,279,184
CONTROL MECHANISM

Filed July 15, 1964  4 Sheets-Sheet 1

INVENTOR.
LEROY D. FELIX
JOHN D. STROUP
BY *Ronald W. Mayes*
ATTORNEY

Oct. 18, 1966 L. D. FELIX ETAL 3,279,184
CONTROL MECHANISM
Filed July 15, 1964 4 Sheets-Sheet 3

INVENTOR.
LEROY D. FELIX
JOHN D. STROUP
BY Ronald U. Mayes
ATTORNEY

Oct. 18, 1966    L. D. FELIX ETAL    3,279,184
CONTROL MECHANISM
Filed July 15, 1964    4 Sheets-Sheet 4

INVENTOR.
LEROY D. FELIX
JOHN D. STROUP
BY Ronald U. Mayes
ATTORNEY

United States Patent Office 3,279,184
Patented Oct. 18, 1966

3,279,184
CONTROL MECHANISM
Leroy D. Felix, Wichita, Kans., and John D. Stroup, Seattle, Wash., assignors to The Boeing Company, Seattle, Wash., a corporation of Delaware
Filed July 15, 1964, Ser. No. 382,913
37 Claims. (Cl. 60—230)

This invention relates to control mechanisms. More particularly this invention relates to manually operated control mechanisms suitable for operation by a pilot in an aircraft for controlling one or more functions.

A primary object of this invention is the provision of a novel throttle control mechanism for controlling forward and reverse thrust of a turbine type jet engine.

Another object of this invention is the provision of a novel throttle control mechanism for controlling engine speed and/or an engine thrust reverser.

Another object of this invention is the provision of a novel pilot operated throttle control mechanism in combination with means attached thereto for controlling engine thrust reverser means.

A still further object of this invention is the provision of a novel control mechanism as set forth in the preceding paragraphs for providing for the in-flight control of an engine thrust reverse, the engine preferably being of a turbine type jet engine.

Another object of this invention is the provision of a novel throttle and thrust reverser control system that meets any combination of the following operational requirements:

(a) The control arrangement should be such that the pilot's past experience, training and developed habits will be compatible with the control arrangement and/or used to the maximum.

(b) A minimum of new training or retraining should be required for one to adapt to the system both in flight and on the ground.

(c) The control arrangement in operation should be safe, simple, the motion uncomplicated, and the system reliable so as to require little concentration or attention from a pilot.

(d) Forward movement of the throttle should result in longitudinal acceleration, and aft movement of the throttle should result in longitudinal deceleration.

(e) The pilot must not have available, or have to select from an infinite number of throttle and thrust reverser position combinations when the thrust reverser is in operation.

(f) Each throttle and thrust reverser for an engine should be completely independent of any other engine throttle and thrust reverser. There can be many situations where a pilot will need to modulate one engine in and out of reverse thrust while another engine may be at full power, idle, or cutoff.

(g) It should be possible to operate an engine at maximum thrust while its thrust reverser is in a full reverse position.

(h) The thrust reverser must be capable of being operated throughout a flight envelope up to an arbitrarily selected engine r.p.m.

(i) Although there is no requirement to modulate a thrust reverser at idle power, there is a requirement for permitting the reversal of thrust at a throttle control lever idle power setting with power automatically increasing to a maximum without additional forward throttle control lever movement.

The invention further resides in certain novel features of construction, combinations, and arrangements of parts and further objects and advantages of the invention will be apparent to those skilled in the art to which it pertains from the following description of the present preferred embodiment thereof described with reference to the accompanying drawings, which form a part of this specification, wherein the same reference numerals indicate corresponding parts throughout the several views and in which.

Figure 1:
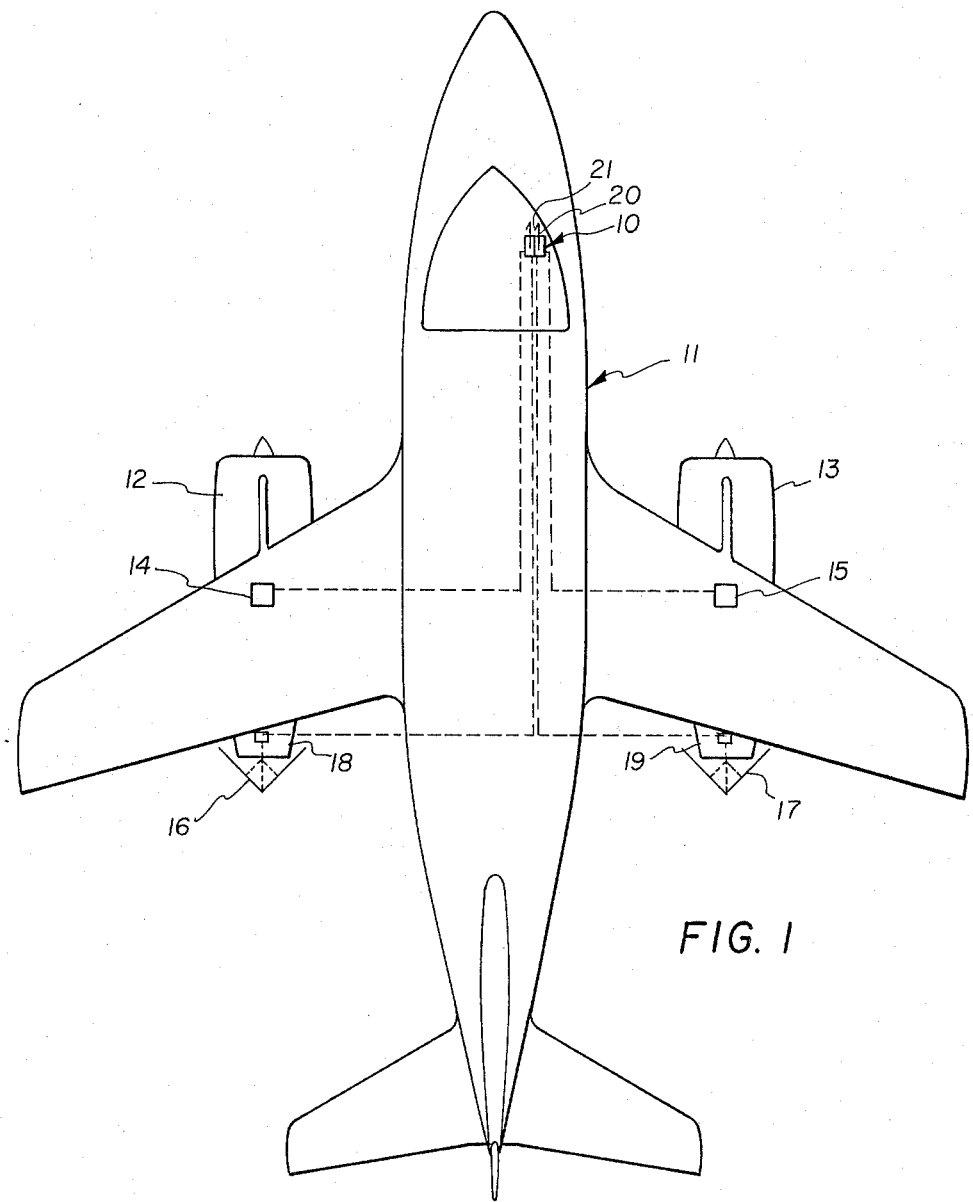
FIG. 1 is a simplified schematic representation of a jet aircraft embodying the invention.

It is to be understood that the invention is not limited to the details of construction and the arrangements of parts shown in the drawings and hereafter described in detail, but is capable of being otherwise embodied and of being practiced and carried out in various ways. It is to be further understood that the terminology employed herein is for the purpose of description and there is no intention to herein limit the invention beyond the requirements of the prior art.

Referring to FIG. 1, the reference numeral 10 indicates generally each of two similar control mechanisms embodying the invention in side-by-side relationship. Each control mechanism 10 is preferably pilot operated and is accordingly located in a pilot's cockpit of a jet aircraft 11. The aircraft 11 has a pair of jet engines 12 and 13. The engines 12 and 13 are of conventional construction and are provided with throttle means 14 and 15, and thrust reverser means 16 and 17. The engines 12 and 13 are shown equipped with afterburners 18 and 19, respectively.

The mechanism 10 is a dual purpose mechanism. Each mechanism 10 comprises a jet engine throttle lever 20 having a finger-operated thrust reverser tab or arm 21 for converting the throttle lever 20 into a combined thrust and thrust reverser control lever.

Figure 2:
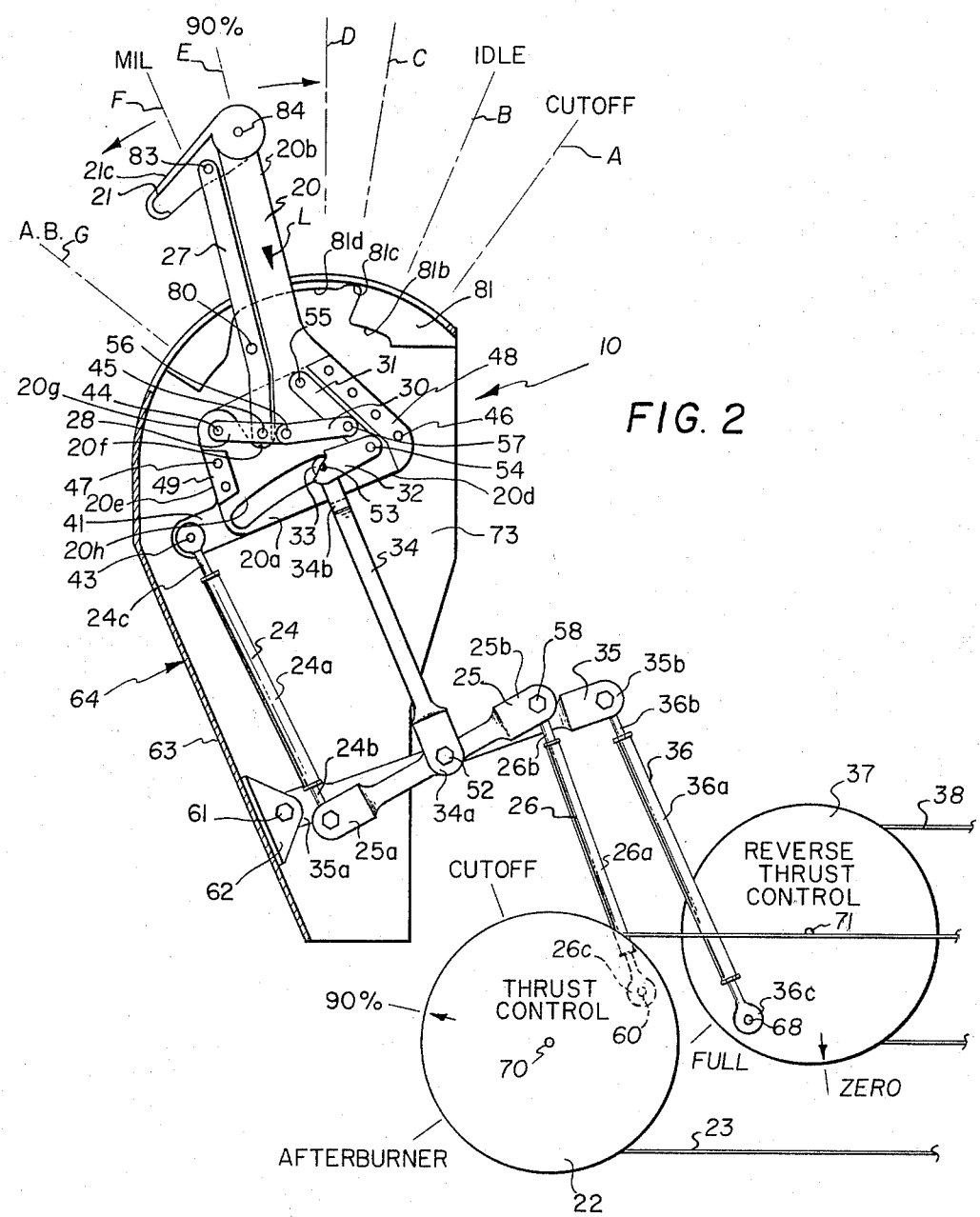
FIG. 2 is an elevational view of a port side of a mechanism embodying the invention in engine forward thrust control mode, but with a side of a housing and a cover plate removed on the lower portion of the control lever to show a part of the internal mechanism thereof.
Figure 4:
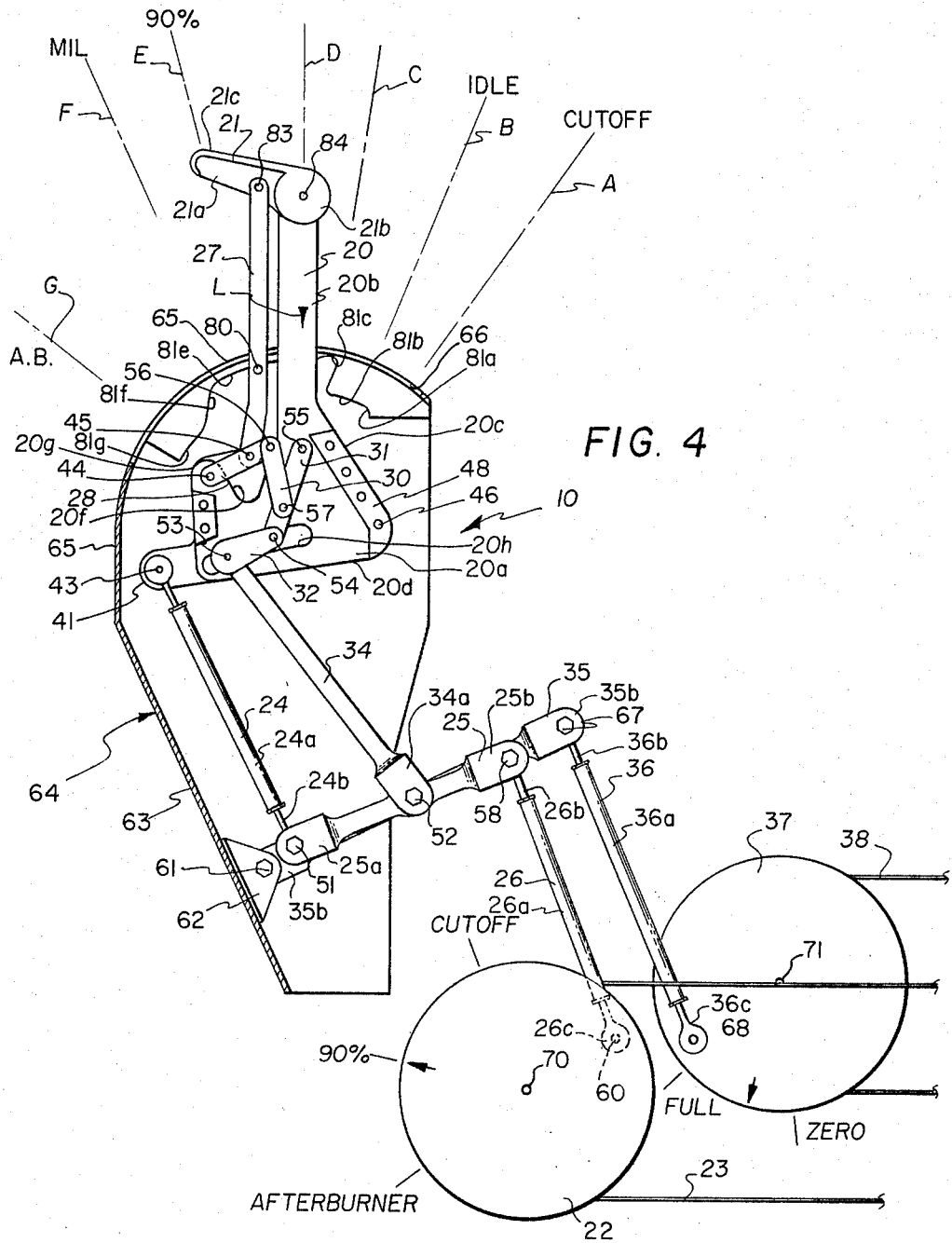
FIG. 4 is a view similar to FIG. 2, but with the mechanism thereof in engine reverse thrust control mode.

Referring to the drawings, a jet engine throttle lever 20 is attached to each of the dual purpose mechanisms 10, only one mechanism being shown in FIGS. 2 and 4. Each lever 20 is suitable for controlling the thrust of one of the jet engines 12 and 13, or for controlling the position of one of the clam shell type thrust reversers 16 and 17 while simultaneously controlling the thrust of one of the jet engines 12 and 13. It is preferred that each engine be controlled with this invention 10 arranged in side-by-side relationship.

Figure 3:
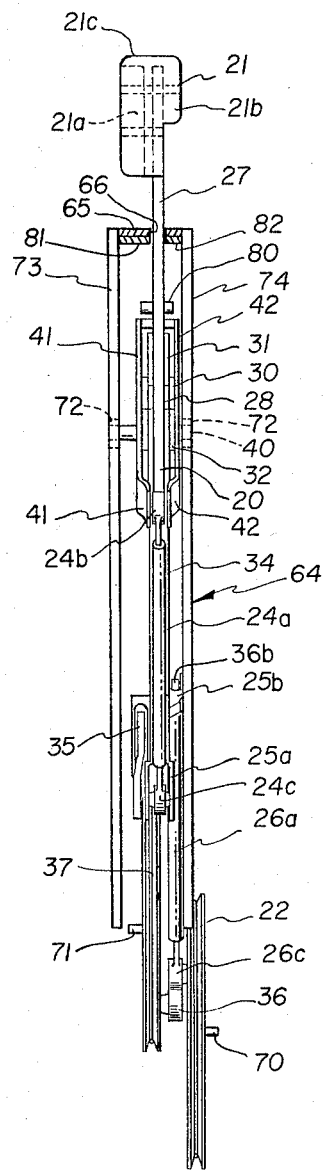
FIG. 3 is a fore end view of FIG. 2.

When the tab 21 on the lever 20 is moved to the down position as in FIGS. 2 and 3, the thrust reverser 16 is taken out of operation and, for example, only the throttle means 14 of the jet engine 12 is controlled.

When the tab 21 is in the up position as in FIG. 4, the thrust reverser 16 is automatically brought into operation. It is preferred that the thrust reverser buckets, often called clam shells, doors, deflectors, brakes, and the like, are moved into full reverse thrust position in approximately two seconds by suitable conventional mechanism, not shown.

Simultaneous with the lifting of the tab 21, the engine 12 is preferably accelerated to at least ninety percent r.p.m. regardless of the position of the lever 20. This takes about six or seven seconds in some conventional jet engines. Accordingly, the thrust reverser 16 is in this example moved into reverse thrust position in about a third of the time it takes for the engine 12 to come to ninety percent of maximum RPM.

As pointed out, the mechanism of FIGS. 2 to 4 embodying the invention is arranged in such a manner that when the tab 21 is completely down, the lever 20 operates only the throttle 14 of the jet engine 12. For purposes of illustration only, a plurality of lever position center lines A, B, C, D, E, F and G have been shown in FIGS. 2 and 4 to respectively indicate the following when the marker arrow L of the lever 20 is aligned therewith. Assuming the tab 21 is down as in FIG. 2 for normal throttle operation, the center line A aligned with the lever marker L indicates engine idle cutoff position of the lever 20, the center line B aligned with the marker L indicates engine idle position, the center lines C and D aligned with the marker L indicate proportionately increased engine r.p.m. throttle positions, the center line E aligned with the marker L indicates the ninety percent r.p.m. throttle position, the center line F aligned with the marker L indicates maximum engine throttle position, and the center line G aligned with the marker L indicates the throttle lever position at which the afterburner is brought into operation.

Forward movement of the throttle lever 20 from the A to G positions results in longitudinal acceleration of the aircraft 11. Aft or reverse movement of the throttle lever 20 results in longitudinal deceleration and decreased speed of the aircraft 11.

If, however, the tab 21 is lifted into the thrust reverser operating position shown in FIG. 4, the normal throttle operation function of the lever 20 is nullified and the lever 20 performs the following functions. When the lever 20 is at or between the center lines E, F and G, the thrust reverser buckets are retracted or remain retracted. This is true regardless of whether the tab 21 is up or down. When the tab 21 is raised, movement of the lever 20 from the position E towards or through the positions D, C and B, causes the thrust reverser 14 to be moved to full reverse thrust position and the engine speed to remain at ninety percent r.p.m., until the lever 20 reaches the position B and the cam pin 80 is at 81c where the buckets remain fully closed and the engine speed is increased to one hundred percent r.p.m. The engine speed between the positions C, D and E is automatically adjusted to ninety percent r.p.m. as soon as the tab 21 is moved to the up position.

The ninety percent value is understood to have been arbitrarily selected and used herein for illustrative purposes and the invention is not to be limited to this value, since other values can be selected.

It is also to be understood that the thrust reversers can be arranged to assume only the two discrete positions of fully retracted or fully extended. However, it is preferred that the thrust reversers be gradiently extended or retracted according to the position of the lever 20 between the positions C and F. As presently configured, angular displacement of the pulley 37 from the zero position in FIG. 2 to the intermediate position in FIG. 4 is adequate to cause the thrust reverser 16 to be extended into a coresopnding intermediate reverse thrust position.

If the lever 20 is to be moved from position B to the cutoff position A, the tab 21 must be lowered whereby the engine speed is slowed to idling speed and the thrust reverser 16 is automatically retracted. When the lever 20 is moved to the position A, the throttle 14 is closed, the engine 12 is cut off and the buckets of the thrust reverser 16 remain retracted.

Any time the tab 21 is moved to the complete down position, the buckets 16 are automatically retracted and the engine r.p.m. is automatically adjusted to the existing relative position of the throttle lever 20. If the throttle lever 20 is pulled to or next to the position B, so that the cam pin 80 is at the position C when the tab 21 is raised, the engine speed is increased to maximum r.p.m. while the buckets move to the full reverse position for maximum reverse thrust. Lowering of the tab 21 automatically returns the engine 12 to normal speed for that lever position and retracts the buckets 16. The movement of the throttle lever 20 to the engine cutoff position A shuts off the supply of fuel to the engine 12 and, consequently, shuts down the engine.

It is possible to begin to advance the throttle lever 20 beyond the E position with the tab 21 in the up position towards the afterburner position G, but the buckets 16 are immediately retracted or remain retracted as the tab 21 is cammed into the down position. The engine speed is then adjusted to the repositioning of the throttle lever 20 in normal throttle operation.

The throttle lever 20 with the tab 21 in the down position, as shown in FIG. 2, controls the speed of the engine 12 via a remotely located pulley 22 that drives an endless cable 23 connected to the engine throttle means 14. Movement of the lever 20 results in movement of the throttle pulley 22 by way of a throttle shift rod 24, a throttle rocker arm 25, and a throttle push-pull rod 26. The thrust reverser tab 21, a link 27, two parallel control arms 28, two parallel connecting links 30, two radius arms 31, two parallel links 32, a cam follower 33, an afterburner and throttle control follower rod 34, a thrust reverser control rocker arm 35, a thrust reverser push-pull rod 36, a thrust reverser control pulley 37, and an endless cable 38 remain relatively stationary. More particularly, the rod 34, the arm 35, the rod 36, the pulley 37, and the cable 38 remain stationary since the lever 20 pivots about a pair of coaxial short pivot shafts 40. When the tab 21 is down, the axis of the cam follower 33 is coincidental with the axis of the shafts 40. The elements 21, 27, 28, 30, 31, 32 and 33 are all caged and tilted as a unit along with the lever 20 when the lever 20 is tilted or pivoted about the transverse pivot axis defined by the short pivot shafts 40, FIG. 3. A lower stem or root portion 20a of the lever 20 forms a main frame for supporting and caging the elements 28, 30, 31, 32 and 33. The shape of the lever 20 is best shown in FIGS. 2 and 4. The lever 20 is flat and has an upper stem 20b of rectangular cross-section and parallel sides. The lower portion 20b of the lever 20 has an aft edge 20c that extends downwardly and rearwardly at an acute angle of approximately thirty-five degrees with the longitudinal axis of the stem 20b. A lower edge 20d of the lower stem portion 20a extends transversely of the lever stem 20b at an angle of approximately seventy degrees to the edge 20c and approximately eighty degrees to the stem 20b. The fore end of the lower step portion 20a is rounded or radiused at the corners and has an edge portion 20e disposed at an acute angle of approximately eighty degrees to the lower edge portion 20d.

An upper edge 20f of the fore end or toe of the lower stem portion 20a is curved and has the shape of an inverted lazy S with a semicircular toe flange 20g. The toe flange 20g has the two parallel control arms 28 pivotally connected thereto on either side thereof by a pin 44. The upper edge 20f is curved deeply enough downwardly sufficient to freely accommodate movement of a pin 45 that connects the lower end of the link 27 to the two parallel control arms 28, as seen in FIGS. 2 and 4. The upper end of the shift rod 24 is shown pivotally connected to a semicircular protruding fore end of each of the two cover plates 41 and 42 by means of a pivot pin 43, FIG. 3. The FIGS. 2 and 4 do not show the cover plate 42, which has been removed for illustrative purposes in these views.

The cover plates 41 and 42, FIG. 3, are each secured to opposite sides of the lower stem portion 20a by suitable means such as four aligned screws 46 at the aft end thereof and screws 47 at the fore end thereof. In order to space each of the cover plates 41 and 42 away from the lower stem portion 20a a distance sufficient to accommodate the unencumbered movement of the elements 27, 28, 30, 31, 32, 33 and 34, two pairs of spacers 48 and 49 are interposed between the plates 41 and 42 and the lower stem portion 20a, at the aft and fore ends thereof respectively. Each of the two spacers 48 has a rectangular cross-section and is elongated. The aft edges of the spacers 48 conform with the aft edge contour of the lower stem edge portion 20c. Each of the two spacers 49 has a trapezoidal shape with a fore edge coinciding with the fore edge 20e of the lower stem portion 20a.

Because of the interposition of the spacers 48 and 49, the elements 27, 28, 30, 31, 32, 33 and 34 are free to be moved when the tab 21 is lowered or raised to the positions respectively shown in FIGS. 2 and 4.

The shift rod 24 is preferably a turnbuckle comprising an elongated female nut member 24a with two male members 24b and 24c threaded into the ends thereof. Each male member 24b and 24c has an eyelet end portion. The member 24b is disposed between and pivotally connected to the cover plates 41 and 42 by means of the pin 43. The male eyelet member 24c is disposed between the flange or legs of a bifurcated end portion 25a of the rocker arm 25 by means of a pin 51.

The follower rod 34 has two bifurcated ends 34a and 34b. The lower end 34a straddles midportions of the rocker arms 25 and 35 and is pivotally secured thereto by a pin 52. The bifurcated upper end 34b of the follower rod 34 straddles the lower edge 20d of the lower stem portion 20a. The cam follower 33 comprises a cylindrical wheel that is journaled on a pin 53 between the legs of the bifurcated upper end 34b of the follower rod 34. The fore ends of the two parallel links 32 are also pivotally connected by the pin 53 to the upper end 34b of the follower rod 34. The cam follower 33 rolls in an arcuate cam slot 20h formed in the lower stem portion 20a.

The aft end of each of the two parallel links 32 is pivotally connected by a separate pin 54, only one being shown in FIGS. 2 and 4, to a lower end of a juxtaposed radius arm 31 on each side of the lower stem portion 20a. The upper end of each of the two radius arms 31 is pivotally connected to the lower stem portion 20a by a single pin 55.

Motion is transmitted to the radius arms 31 and the links 32, for the positioning of the cam follower 33 in its slot 20h, by the tab 21, the link 27, the control arms 28, and the connecting links 30. Each arm 28 has its aft end pivotally connected by a separate pin 56 to a fore end of the juxtaposed link 30. The aft end of each of the links 30 is pivotally connected by a separate pin 57 to a midportion of the juxtaposed radius arm 31. The pin 57 is closer to the pin 54 than to the pin 55.

The aft end 25b of the rocker arm 25 controls the angular position of the engine throttle pulley 22 by the push-pull rod 26. Preferably the rod 26 is a turnbuckle similar to the turnbuckle 24. The rod 26 comprises an elongated female nut member 26a with a male eyelet member 26b threaded into an upper end thereof and a male eyelet member 26c threaded into the lower end thereof. The eyelet member 26b is disposed between the bifurcated end 25b of the rocker arm 25 and is pivotally connected to the rocker arm 25 by a pin 58. The eyelet member 26c, forming the lower end of the rod 26, is fastened onto the back side of the pulley 22 by a pivot pin 60 adjacent the periphery of the pulley 22. The lower end of the rod 26 is hidden behind the pulley in FIGS. 2 and 4, but is shown in FIG. 3.

The aft end of the thrust reverser rocker arm 35 can be caused to pivot downwardly and upwardly about a pivot pin 61 by operation of the follower rod 34. A fore end 35a of the rocker arm 36 is disposed between parallel flanges of a U-shaped support bracket 62 having a web fixed to a flat wall 63 of a sheet metal housing, indicated generally by the reference numeral 64. The upper end of the housing 64 has a curved, generally cylindrical wall 65 having an arcuate slot 66 formed therein.

The rocker arm 35 has a bifurcated aft end 35b for controlling the angular position of the thrust reverser control pulley 37 via the push-pull rod 36. The rod 36 comprises a turnbuckle having an elongated female nut portion 36a having male eyelet members 36b and 36c respectively threaded into the upper and lower ends thereof. The upper male eyelet member 36b is disposed between the bifurcated end 35b of the rocker arm 35 and is pivotally connected thereto by a pin 67. The lower male eyelet member 36c is pivotally connected to the pulley 37 near the periphery thereof by a pin 68.

The pulleys 22 and 37 are respectively journaled on pins 70 and 71 fixed to and carried by a fuselage frame member, not shown, of the aircraft 11.

From the foregoing description, it is apparent that forward movement of the lever 20 with the tab 21 down, FIG. 2, results in the tilting of the lower stem portion 20a on the pair of short shafts 40, FIG. 3, with an accompanying downward movement of the shift rod 24, the counterclockwise tilting of the rocker arm 25 about the pin 52, the upward movement of the push-pull rod 26, the counterclockwise movement of the throttle pulley 22, and the counterclockwise travel of the cable 23. The rest of the mechanism remains relatively inactive with the follower arm 34, the rocker arm 35, the push-pull rod 36, the pulley 37, and the cable 38 remaining stationary.

However, if the tab 21 is raised as shown in FIG. 4, the thrust reverser pulley 37 is actuated. The lever 20 must pivot as a whole on the short shafts 40 as seen in FIG. 3. The shafts 40 are each journaled in an antifriction journal bearing assembly 72 respectively carried by a pair of parallel walls 73 and 74 of the housing 64. Another device 10, not shown, is installed on the opposite side of the wall 73. The wall 74 in FIG. 3 has been omitted in FIGS. 2 and 4 so that the internal mechanism of the device 10 is revealed.

The raising of the tab 21 brings an automatic throttle control mechanism into operation as well as actuating the thrust reverser into a reverse thrust position for deceleration or braking effect corresponding to the position of the lever 20 between the positions B and F. The automatic throttle control mechanism comprises a throttle cam follower pin 80 fixed in and extending through the link 27 near the lower end thereof. The cam follower pin 80 is adapted to ride on a pair of inverted cam tracks 81 and 82, FIG. 4, fixed to the underside of the upper portion 65 of the housing 64 on either side of the slot 66.

The tab 21 comprises an elongated vertical flange 21a and a parallel cylindrical flange 21b. An upper surface 21c of the tab 21 is elongated and has a generally flat central portion and arcuately curved portions at the fore and aft ends thereof. The upper end of the link 27 is pivotally connected to a midportion of the flange 21a of the tab 21 by a pin 83. The upper end of the lever 20 is disposed between the flanges 21a and 21b and is pivotally connected thereto by a pin 84.

The pins 44, 45, 53, 54, 55, 56, 57, 80, 83 and 84 are conventional pins, such as headed rivets, nuts and bolts, or the like. The pins 43, 51, 52, 58, 60, 61, 67, 68, 70 and 71 are conventional nuts and bolts of suitable configuration.

In comparing FIG. 4 with FIG. 2, when the tab 21 is raised, the link 27 is raised and the mechanism comprising the elements 28, 30, 31 and 32 urges the cam roller 33 and the follower rod 34 forwardly in the cam slot 20h a distance away from the axis of the lever 20 as defined by the short shafts 40, FIG. 3. This causes the thrust reverser 16 to be actuated to full thrust reversal position, FIG. 1, by turning of the pulley 37 clockwise to a full reverse thrust position, it being a requirement that the buckets of the thrust reverser be retracted or extended to a reverse thrust position corresponding to the position of the lever 20 between the positions B and F.

In FIG. 4, the lever 20 is between D, E, F positions which means that the thrust cam pin 80 is urged upwardly against the track of the throttle cams 81 and 82 until the engine is speeded up to ninety percent r.p.m. as defined by the continuously arcuate cam track portions 81e and f. Forward and reverse movement of the lever 20 between the positions C, D and E with the cam pin 80 between the positions D, E, F cannot alter the speed of the engine but controls the position of the thrust reverser when the tab 21 is up. Forward movement of the lever 20 with the tab 21 up increases the aircraft speed, but aft movement of the lever 20 slows the speed of the aircraft.

However, if the lever 20 is moved towards the position B, the cam pin 80 is moved upwardly into the notched track portion 81c of the cam 81, FIG. 4, and the engine is speeded up to one hundred percent r.p.m. and the thrust reverser goes to full reverse thrust position for maximum deceleration.

If it is desired to idle the engine, the lever 20 must be moved rearwardly to the position B. Tab 21 must be down when the lever 20 is at the position B to provide idle r.p.m. If the tab 21 is up when the lever 20 is at this position, the thrust reverser is extended and the engine r.p.m. will be one hundred percent as described before. Once the tab 21 is lowered and the lever 20 is pulled back to the position A, the tab 21 is guided by the cam track portion 81b at the position B. The thrust reverser 16 is automatically retracted on lowering of the tab 21.

Further movement of the lever 20 rearwardly completely shuts off the supply of fuel to the engine at engine cutoff position A.

Forward movement of the lever 20 along a curved cam ramp portion 81f from positions F to G automatically cams the cam pin 80 downwardly thus lowering the tab 21, for retracting the thrust reverser 16. At position G the engine speed is at maximum r.p.m. with afterburner thrust augmentation. As shown in FIG. 4, the afterburner is adapted to be operated by angularly displacing or turning the pulley 22 to a predetermined position. The throttle and afterburner mechanism controlled by the cable 23 is not shown just as the mechanism controlled by the thrust reverser control cable 38 is not shown. Suitable conventional mechanisms for these functions are available and are well known in the art.

It will be understood that this invention can be modified to adapt it to various circumstances and conditions, and it is accordingly desired to comprehend within the purview of this invention such modifications as may be considered to fall within the scope of the appended claims.

What is claimed is:

1. A control mechanism for an aircraft having a jet engine with thrust reverser means and comprising, throttle control means movable through a range of positions from power cutoff and minimum power positions to full jet engine power, thrust reverser control means movable to and from a retracted position and a full thrust reverser position, lever means adapted to be manually operated connected to said throttle control means and said thrust reverser control means, and selector means connected to said lever means for permitting said throttle control means to be operated independently of said thrust reverser control means in one position thereof and for interconnecting said throttle control means and said thrust reverser control means for permitting the active control and interaction of said throttle control means and said thrust reverser control means in another position of said selector means.

2. A control mechanism comprising, first control means movable through a range of positions, second control means movable to and from a first position and a second position, third means adapted to be manually operated connected to said first control means and said second control means, and fourth means connected to said third means for permitting said first control means to be operated independently of said second control means in one position thereof and for interconnecting said first control means and said second control means for obtaining active control and interaction of said first control means and said second control means by said third means in another position of said fourth means.

3. A control mechanism for an aircraft having a jet engine with thrust reverser means and comprising, throttle control means including cable and pulley means movable through a range of positions from power cutoff and minimum power positions to full jet engine power and full afterburner positions, thrust reverser control means including cable and pulley means movable to and from a retracted position and a full thrust reverser position, pivotally mounted lever means adapted to be manually operated connected to said throttle control means and said thrust reverser control means, and selector tab means connected to an upper end of said lever means for permitting said throttle control means to be operated independently of said thrust reverser control means in one position thereof and for interconnecting said throttle control means and said thrust reverser control means for permitting the active control and interaction of said throttle control means and said thrust reverser control means in another position of said selector means.

4. A control mechanism for an aircraft having an engine with thrust reverser means and comprising, throttle control means movable through a range of positions from power cut off and minimum power positions to full engine power, thrust reverser control means for controlling the thrust reverser, lever means adapted to be manually operated connected to said throttle control means and said thrust reverser control means, and selector means connected to said lever means for permitting said throttle control means to be operated independently of said thrust reverser control means in one position thereof and for interconnecting said throttle control means and said thrust reverser control means for permitting the active control and interaction of said throttle control means and said thrust reverser control means in another position of said selector means.

5. A control mechanism comprising, a frame, first pulley means supported by said frame, second pulley means supported by said frame, first push rod means having one end pivotally connected to said first pulley means, first rocker arm means having one end pivotally connected to another end of said first push rod means, second rocker arm means, second push rod means having one end pivotally connected to said second pulley means and another end pivotally connected to said second rocker arm means, said second rocker arm means having another end pivotally connected to said frame, pivot means pivotally connecting said first rocker arm means to said second rocker arm means, third push rod means having one end pivotally connected to another end of said first rocker arm means, fourth push rod means having one end pivotally connected to said pivot means, and lever means connected to and controlling said third and fourth push rod means for respectively tilting said first rocker arm means independently of said second rocker arm means and for tilting said first and second rocker arm means in unison and thereby respectively actuating said first pulley means independently of said second pulley means and actuating said first and second pulley means in unison.

6. A control mechanism as set forth in claim 5, wherein said lever means includes stem means having one end pivotally connected to said third push rod means, means forming a cam follower slot in a lower end of said stem means, cam follower means carried by said fourth push rod means and disposed in and guided by said cam slot, means pivotally supporting said lever stem means for being tilted about a fixed pivot axis that is coincidental with a point on a center line of said cam slot, and said lever means includes mechanism means manually operated independently of said lever stem means for shifting said cam follower means along the center line of said cam slot, said first pulley means being actuated by movement of said lever stem means and said second pulley means at the same time remaining stationary on the movement of said stem means when said cam follower means is coincidental with said fixed pivot axis of said lower stem means, and said second pulley means being actuated and moved by movement of said lever means when said cam follower means is positioned elsewhere in said cam slot of said lever stem means other than a position coincidental with said fixed pivot axis of said lever stem means.

7. A control mechanism as set forth in claim 5, wherein said first, second, and third push rod means each comprises turnbuckles.

8. A control mechanism comprising, a frame, first means supported by said frame, second means supported by said frame, first rod means having one end connected to said first means, first arm means having one end connected to another end of said first rod means, second arm means, second rod means having one end connected to said second means and another end connected to said second arm means, said second arm means having another end connected to said frame, pivot means connecting said first arm means to said second arm means, third rod means having one end connected to aother end of said first arm means, fourth rod means having one end connected to said pivot means, and lever means connected to and controlling said third and fourth rod means for respectively moving said first arm means independently of said second arm means and for moving said first and second arm means in unison and thereby respectively actuating said first means independently of said second means and actuating said first and second means in unison.

9. A control mechanism as set forth in claim 8, wherein said first and second means each include a pulley, said first and second arm means each include a rocker arm, and said first, second, third and fourth rod means each include a push rod.

10. A control mechanism as set forth in claim 8, wherein said first means is adapted to be connected to control the thrust and speed of a jet engine, and said second means is adapted to be connected to a thrust reverser of the jet engine.

11. A control mechanism comprising, a frame, first pulley means supported by said frame, second pulley means supported by said frame, first push rod means pivotally connected to said first pulley means, first rocker arm means pivotally connected to said first push rod means, second rocker arm means, second push rod means pivotally connected to said second pulley means and said second rocker arm means, said second rocker arm means being pivotally connected to said frame, pivot means pivotally connecting said first rocker arm means to said second rocker arm means, third push rod means pivotally connected to said first rocker arm means, fourth push rod means pivotally connected to said pivot means, and lever means connected to and controlling said third and fourth push rod means for respectively tilting said first rocker arm means independently of said second rocker arm means and for tilting said first and second rocker arm means in unison and thereby respectively actuating said first pulley means independently of said second pulley means and actuating said first and second pulley means in unison.

12. A control mechanism comprising, first follower means, second follower means, lever means including stem means having one end pivotally connected to said first follower means, means forming a cam follower slot in a lower end of said stem means, cam follower means carried by said second follower means and disposed in and guided by said cam slot, means pivotally supporting said lever stem means for being tilted about a fixed pivot axis that is coincidental with a point on a center line of said cam slot, and said lever means including mechanism means manually operated independently of said lever stem means for shifting said cam follower means along the center line of said cam slot, said first follower means being actuated by movement of said lever stem means and said second follower means at the same time remaining stationary on the movement of said stem means when said cam follower means is coincidental with said fixed pivot axis of said lever stem means, and said second follower means being actuated and moved by movement of said lever means when said cam follower means is positioned elsewhere in said cam slot of said lever stem means other than coincidental with said fixed pivot axis of said lever stem means.

13. A control mechanism as set forth in claim 12, wherein said first and second follower means each comprises turnbuckles.

14. A control mechanism as set forth in claim 12, wherein said first follower means controls the speed and thrust of a jet engine and said second follower means controls thrust reversers of the jet engine.

15. A control mechanism comprising, first means, second means, lever means including stem means connected to said first means, means forming a cam follower slot in said stem means, cam follower means carried by said second means guided by said cam slot, third means supporting said lever stem means for being tilted about a fixed pivot axis that is coincidental with a point on a center line of said cam slot, and said lever means including mechanism means manually operated independently of said stem means for shifting said cam follower means along the center line of said cam slot, said first means being actuated by movement of said lever stem means and said second means at the same time remaining stationary during movement of said stem means when said cam follower means is coincidental with said fixed pivot axis of said stem means, and said second means being actuated and moved by movement of said lever means when said cam follower means is positioned elsewhere in said cam slot of said stem means other than coincidental with said fixed pivot axis of said stem means.

16. A control mechanism as set forth in claim 15, wherein said mechanism means comprise first element means having one end pivotally connected to an upper end of said stem means of said lever means, second element means having an upper end pivotally connected to a midportion of said first element means, third element means having a midportion pivotally connected to a lower end of said second element means and having one end pivotally connected to a midportion of said stem means, fourth element means having one end pivotally connected to another end of said third element means, fifth element means having one end pivotally connected to a midportion of said stem means and having a midportion pivotally connected to another end of said fourth element means, and sixth element means having one end pivotally connected to another end of said fifth element means and having another end pivotally connected to said cam follower means.

17. A control mechanism as set forth in claim 16, wherein said third, fourth, fifth and sixth element means each comprises two levers sandwiching said stem means therebetween.

18. A control mechanism comprising, an housing having a slot formed in an upper surface thereof, cam track means disposed on the underside of said housing adjacent said slot, first means, second means, lever means extending upwardly through said slot and including stem means connected to said first means, means forming a cam follower slot in said stem means, cam follower means carried by said second means guided by said cam slot, third means supporting said lever stem means for being tilted about a fixed pivot axis that is coincidental with a point on a center line of said cam slot, and said lever means including mechanism means adapted to be manually operated independently of said stem means for shifting said cam follower means along the center line of said cam slot, said first means being actuated by movement of said lever stem means but said second means remaining stationary on the movement of said stem means when said cam follower means is coincidental with said fixed pivot axis of said stem means, and said second means being actuated and moved by movement of said lever means when said cam follower means is positioned elsewhere in said cam slot of said stem means other than coincidental with said fixed pivot axis of said stem means, and cam track follower means carried by said mechanism means adapted to ride along said cam track means and to be positioned thereby for controlling the position of said cam follower means along the center line of said cam slot.

19. A control mechanism as set forth in claim 18, wherein said mechanism means comprise first element means having one end pivotally connected to an upper end of said stem means of said lever means, second element means having an upper end pivotally connected to a midportion of said first element means, third elements means having a midportion pivotally connected to a lower end of said second element means, and having one end pivotally connected to a midportion of said stem means, fourth element means having one end pivotally connected to another end of said third element means, fifth element means having one end pivotally connected to a midportion of said stem means and having a midportion pivotally connected to another end of said fourth element means, and sixth element means having one end pivotally connected to another end of said fifth element means and having another end pivotally connected to said cam follower means, said cam track follower means being carried by said second element means, and said second element means extending through said housing slot.

20. A control mechanism as set forth in claim 19, wherein said third, fourth, fifth and sixth element means each comprises two levers sandwiching said stem means therebetween, and said cam track follower means comprises a dowel pin.

21. In an aircraft having a jet engine with thrust reverser means, a control mechanism for controlling the speed of the aircraft thrust reverser means and jet engine speed control lever means having a stem means, first element means having one end connected to an upper end of said stem means of said lever means, second element means having an upper end pivotally connected to a midporttion of said first element means, third element means having a midportion pivotally connected to a corner end of said second element means and having one end pivotally connected to a midportion of said stem means, fourth element means having one end pivotally connected to another end of said third element means, fifth element means having one end pivotally connected to a midportion of said stem means and having a midportion pivotally connected to another end of said fourth element means, and sixth element means having one end pivotally connected to another end of said fifth element means and having another end pivotally connected to said cam follower means.

22. In an aircraft as set forth in claim 21, wherein said third, fourth, fifth and sixth element means each comprises two levers sandwiching said stem means therebetween.

23. In an aircraft having a jet engine with thrust reverser means, a control mechanism for controlling the speed of the aircraft comprising, a frame, first pulley means supported by said frame and connected to the jet engine for controlling the speed of the same, second pulley means supported by said frame and connected to the thrust reverser means for controlling the position of the same, first push rod means having one end pivotally connected to said first pulley means, first rocker arm means having one end pivotally connected to another end of said first push rod means, second rocker arm means, second push rod means having one end pivotally connected to said second pulley means and another end pivotally connected to said second rocker arm means, said second rocker arm means having another end pivotally connected to said frame, pivot means pivotally connecting said first rocker arm means to said second rocker arm means, third push rod means having one end pivotally connected to another end of said first rocker arm means, fourth push rod means having one end pivotally connected to said pivot means, and lever means connected to and controlling said third and fourth push rod means for respectively tilting said first rocker arm means independently of said second rocker arm means and for tilting said first and second rocker arm means in unison and thereby actuating said first pulley means independently of said second pulley means and actuating said first and second pulley means in unison.

24. In an aircraft having a jet engine with thrust reverser means, a control mechanism for controlling the speed of the aircraft comprising, a frame, first means supported by said frame and connected to the jet engine for controlling the speed of the same, second means supported by said frame and connected to the thrust reverser means for controlling the position of the same, first rod means having one end connected to said first means, first arm means having one end connected to another end of said first rod means, second arm means, second rod means having one end connected to said second means and another end connected to said second arm means, said second arm means having another end connected to said frame, pivot means connecting said first arm means to said second arm means, third rod means having one end connected to another end of said first arm means, fourth rod means having one end connected to said pivot means, and lever means connected to and controlling said third and fourth rod means for respectively moving said first arm means independently of said second arm means and for moving said first and second arm means in unison and thereby respectively actuating said first means independently of said second means and actuating said first and second means in unison.

25. In an aircraft as set forth in claim 24, wherein said first and second means each include a pulley, said first and second arm means each include a rocker arm, and said first, second, third and fourth rod means each include a push rod.

26. In an aircraft having a jet engine with thrust reverser means, a control mechanism comprising, first means controlling the speed of the jet engine, second means controlling the thrust reverser means, manually operable lever means including stem means connected to said first means, means forming a cam follower slot in said stem means, cam follower means carried by said second means guided by said cam slot, and third means supporting said stem means for being tilted about a fixed pivot axis that is coincidental with a point on a center line of said cam slot, said lever means including mechanism means manually operated independently of said stem means for shifting said cam follower means along the center line of said cam slot, said first means being actuated by movement of said stem means and said second means remaining stationary at the same time on the movement of said stem means when said cam follower means is coincidental with said fixed pivot axis of said stem means, and said second means being actuated and moved by movement of said lever means when said cam follower means is positioned elsewhere in said cam slot of said stem means other than coincidental with said fixed pivot axis of said stem means.

27. In an aircraft as set forth in claim 26, wherein said mechanism means comprise manually operable first element means having one end pivotally connected to an upper end of said stem means of said lever means, second element means having an upper end pivotally connected to a midportion of said first element means, third element means having a midportion pivotally connected to a corner end of said second element means and having one end pivotally connected to a midportion of said stem means, fourth element means having one end pivotally connected to another end of said third element means, fifth element means having one end pivotally connected to a midportion of said stem means and having a midportion pivotally connected to another end of said fourth element means, and sixth element means having one end pivotally connected to another end of said fifth element means and having another end pivotally connected to said cam follower means.

28. In an aircraft as set forth in claim 27, wherein said third, fourth, fifth and sixth element means each comprises two levers sandwiching said stem means therebetween.

29. In an aircraft having a jet engine with thrust reverser means, a control mechanism for controlling the speed of the aircraft comprising, first means for controlling the speed of the jet engine, second means for controlling the thrust reverser means, manually operable lever means including stem means connected to said first means, said lever means including mechanism means manually operated independently of said stem means for actuating said first means by movement of said stem means and said second means remaining stationary at the same time on the movement of said stem means when said mechanism means is in one position, and simultaneously actuating said first means and said second means by movement of said lever means when said mechanism means is in any other position.

30. In an aircraft having a jet engine with thrust reverser means, a control mechanism comprising, throttle control means movable through a range of positions from power cutoff and minimum power positions to full jet engine thrust, means for controlling and moving the thrust reverser means to and from a retracted position and a full thrust reverser position, lever means adapted to be manually operated connected to said throttle control means and said thrust reverser control means, selector means connected to said lever means for permitting said throttle control means to be operated independently of said thrust reverser control means in one position thereof and for interconnecting said throttle control means and said thrust reverser control means for permitting the active control and interaction of said throttle control means and said thrust reverser control means in another position of said selector means, and means for automatically moving said selector means to said one position when said lever means is moved to at least one preselected engine power setting position.

31. In an aircraft as set forth in claim 30, wherein said one preselected engine power setting position comprises said minimum engine power position.

32. In an aircraft as set forth in claim 30, wherein said one preselected engine power setting position comprises said engine cutoff position.

33. In an aircraft as set forth in claim 30, wherein said one preselected engine power setting position comprises greater than ninety percent of a maximum engine speed position.

34. In an aircraft as set forth in claim 30, wherein said one preselected engine power setting position comprises a maximum engine speed position.

35. In an aircraft as set forth in claim 30, wherein said one preselected engine power setting position comprises said full jet engine thrust position.

36. In an aircraft as set forth in claim 30, wherein said preselected engine power setting position comprises said minimum engine power position and a maximum engine speed position.

37. In an aircraft as set forth in claim 36, wherein said selector means can be moved to said another position thereof between said minimum power position and a maximum engine speed position.

No references cited.

MARK NEWMAN, *Primary Examiner.*

C. R. CROYLE, *Assistant Examiner.*